United States Patent
Dees et al.

(10) Patent No.: US 9,578,442 B2
(45) Date of Patent: Feb. 21, 2017

(54) METHOD AND APPARATUS FOR USER-CONFIGURABLE CONTROL OF WIRELESS DOCKING BETWEEN A PORTABLE DEVICE AND A DOCKING STATION

(71) Applicant: KONINKLIJKE PHILIPS N.V., Eindhoven (NL)

(72) Inventors: Walter Dees, Eindhoven (NL); Koen Johanna Guillaume Holtman, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 235 days.

(21) Appl. No.: 14/359,414

(22) PCT Filed: Nov. 14, 2012

(86) PCT No.: PCT/IB2012/056416
§ 371 (c)(1),
(2) Date: May 20, 2014

(87) PCT Pub. No.: WO2013/076625
PCT Pub. Date: May 30, 2013

(65) Prior Publication Data
US 2014/0330998 A1    Nov. 6, 2014

Related U.S. Application Data

(60) Provisional application No. 61/563,141, filed on Nov. 23, 2011.

(51) Int. Cl.
*G06F 13/00* (2006.01)
*H04W 4/00* (2009.01)
(Continued)

(52) U.S. Cl.
CPC ............ *H04W 4/005* (2013.01); *G06F 1/1632* (2013.01); *G06F 9/4411* (2013.01);
(Continued)

(58) Field of Classification Search
USPC ................... 710/300–315, 104–110
See application file for complete search history.

(56) References Cited

U.S. PATENT DOCUMENTS 6,072,468 A    6/2000  Hocker
6,078,816 A *  6/2000  Weiss ............... H04M 19/04
                                                  455/226.4
(Continued)

FOREIGN PATENT DOCUMENTS

CN    101588617 A    11/2009
JP    2000049699 A    2/2000
(Continued)

OTHER PUBLICATIONS

Kwak, J., "Proposed Text for PSNI Measurement", IEEE 802.11-03/958r1, InterDigital Communications, Nov. 12, 2003.
(Continued)

*Primary Examiner* — Raymond Phan
(74) *Attorney, Agent, or Firm* — Larry Liberchuk (57) ABSTRACT

Configurability and controllability over the initiation of automatic docking for a portable device seeking to dock wirelessly with a docking station in a wireless docking system environment are achieved by the method and system disclosed herein. The portable device detects the docking station in the wireless docking environment. When the docking station is detected, a communication path is established between the portable device and the docking station. A received signal characteristic level is measured for a received signal. The received signal characteristic level is compared to a determined threshold so that, at least when the
(Continued)

received signal level exceeds the determined threshold, docking the portable device to the docking station is able to be completed. The determined threshold is preferably based on signal measurements made for the received signal characteristic level which exceeds a minimum signal strength level required for establishing communication between the portable device and the docking station.

11 Claims, 3 Drawing Sheets (51) Int. Cl.
G06F 9/44 (2006.01)
H04M 1/725 (2006.01)
G06F 1/16 (2006.01)
(52) U.S. Cl.
CPC .... *H04M 1/72527* (2013.01); *H04M 2250/04* (2013.01); *H04M 2250/06* (2013.01)

(56) References Cited

U.S. PATENT DOCUMENTS

| | | | | |
|---|---|---|---|---|
| 7,076,270 B2 * | 7/2006 | Jaggers | ............. | H04M 1/72527 379/428.03 |
| 7,243,233 B2 * | 7/2007 | Kindberg | ............. | G06F 21/445 380/247 |
| 7,271,662 B2 * | 9/2007 | Akamine | ............. | H03F 1/30 330/133 |
| 8,095,072 B2 * | 1/2012 | Zheng | ............. | H04L 41/22 455/41.2 |
| 8,254,992 B1 * | 8/2012 | Ashenbrenner | ....... | G06F 1/1632 455/41.2 |
| 8,260,998 B2 * | 9/2012 | Ganesh | ............. | G01C 21/265 710/300 |
| 8,331,860 B2 * | 12/2012 | Sinivaara | ............. | H04L 67/04 455/41.2 |
| 8,724,541 B2 * | 5/2014 | Rudolf | ............. | H04L 12/24 370/315 |
| 8,943,229 B2 * | 1/2015 | 't Hooft | ............. | G06F 1/1632 710/8 |
| 9,002,377 B2 * | 4/2015 | Ayalur | ............. | H04W 64/00 342/357.2 |
| 2003/0003866 A1 * | 1/2003 | Overy | ............. | G01S 11/16 455/41.1 |
| 2003/0172218 A1 | 9/2003 | Scott | | |
| 2006/0234660 A1 | 10/2006 | Kwak | | |
| 2006/0258289 A1 | 11/2006 | Dua | | |
| 2008/0227393 A1 | 9/2008 | Tang | | |
| 2008/0269927 A1 | 10/2008 | Szolyga | | |
| 2008/0320190 A1 | 12/2008 | Lydon | | |
| 2010/0150125 A1 | 6/2010 | Kwak | | |
| 2012/0214462 A1 * | 8/2012 | Chu | ............. | H04M 19/04 455/418 |
| 2012/0265913 A1 * | 10/2012 | Suumaki | ............. | H04W 4/008 710/303 |
| 2013/0031377 A1 * | 1/2013 | Sultenfuss | ............. | G06F 1/1632 713/300 |
| 2013/0175986 A1 * | 7/2013 | Senatori | ............. | G06F 1/1616 320/108 |

FOREIGN PATENT DOCUMENTS

| | | |
|---|---|---|
| JP | 2003023367 A | 1/2003 |
| JP | 2008205548 A | 9/2008 |
| WO | WO03053048 A1 | 6/2003 |
| WO | WO2012054232 A1 | 4/2013 |
| WO | WO2013076625 A1 | 5/2013 |
| WO | WO2013105005 A1 | 7/2013 |
| WO | WO2013114263 A1 | 8/2013 |

OTHER PUBLICATIONS

Subhan, F. et al, "Minimizing Discovery Time in Bluetooth Networks Using Localization Techniques", 2010 International Symposium in Information Technology, pp. 648-653, Jun. 2010.

* cited by examiner

METHOD AND APPARATUS FOR USER-CONFIGURABLE CONTROL OF WIRELESS DOCKING BETWEEN A PORTABLE DEVICE AND A DOCKING STATION

The present invention relates generally to the field of wireless communications and, more particularly, to wireless docking of a portable device and a docking station.

Docking allows a portable device to be coupled with a docking station. The coupling may occur via a wired connection or via a wireless connection. Typically, the docking procedure and the undocking procedure are completely automatic and require no user intervention. For example, a portable device can actively probe to find a docking station and/or other peripherals for establishing a docking environment. Once the docking environment is discovered, the portable device can automatically set up the connection and start docking.

However, automatically starting the docking procedure as soon as the portable device discovers a docking station is not always desirable. Wireless devices adhering to Wi-Fi Direct and also Bluetooth protocols typically exhibit a communication range of 10 meters or more, especially when such devices use the transmission power required for a high quality connection which would be expected as being the case in wireless docking. At this range, the portable device user may not see, or even be aware of, the station at which docking is being attempted. Automatic docking in this scenario may then lead to unintended and possibly embarrassing results.

In an office environment, a portable device may attempt to dock with each and every docking station that is passed by a user carrying the portable device. The portable device may even attempt to dock with docking stations located on adjacent or nearby desks in surrounding office cubicles. Attempted automatic dockings can interrupt, or interfere with, or significantly degrade the communication or processing session for the devices in docking environments discovered by the portable device attempting the automatic docking. If any of these automatic docking attempts were to be successful, the screen contents of the portable device might be viewable on another and perhaps larger display in the docking environment. Thus, the security and privacy of the information displayed initially on the portable device may be compromised by showing the portable device's information to one or more strangers viewing an attached display in the automatic docking environment.

In view of these problems with automatic docking, it would appear beneficial for an overall user experience to allow the onset of docking or undocking to be controllable and configurable by the user.

Configurability and controllability over the initiation of automatic docking is achieved for a wireless docking system in accordance with the principles of the present invention at least measuring a received signal characteristic level for a received signal, by comparing the received signal characteristic level to a determined threshold, and then by transitioning a state of the portable device to a docked state with the docking station at least when the received signal level exceeds the determined threshold. The determined threshold is preferably based on signal measurements made for the received signal characteristic level which exceeds a minimum signal strength level required for establishing communication between the portable device and the docking station.

The details of one or more implementations are set forth in the accompanying drawings and the description below. Even if described in one particular manner, it should be clear that implementations may be configured or embodied in various manners. For example, an implementation may be performed as a method, or embodied as an apparatus configured to perform a set of operations, or embodied as a computer readable medium storing instructions for performing a set of operations. Other aspects and features will become apparent from the following detailed description considered in conjunction with the accompanying drawings and the claims.

The above-mentioned features and other features and advantages, and the manner of attaining them, will become more apparent and the embodiments herein will be better understood by reference to the following description of the embodiments taken in conjunction with the accompanying drawings, wherein.

The exemplary embodiments set out herein illustrate preferred embodiments of the invention, and such exemplary embodiments are not to be construed as limiting the scope in any manner.

Figure 1:
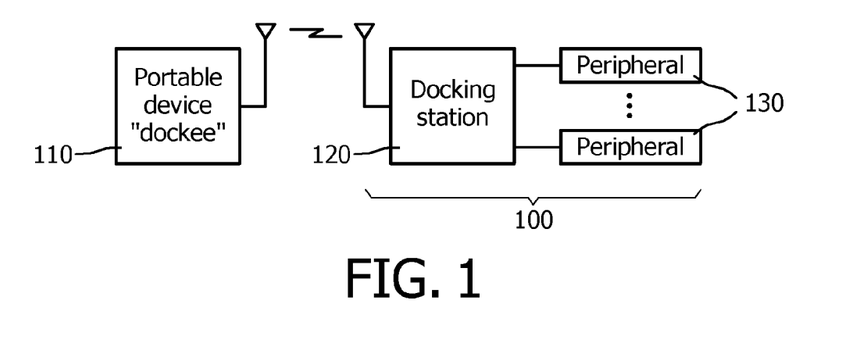
FIGS. 1 and 2 each depict a system block diagram showing an exemplary portable device together with alternate wireless docking environments realized in accordance with the principles of the present invention.

Wireless docking employs wireless communication technology to provide a typically fixed or stationary docking environment for portable devices such as mobile phones, portable computers, other smart devices, and the like. As shown in FIG. 1, the wireless docking environment 100 gives the portable device 110 access via the docking station 120 to peripherals 130, such as a display screen, a keyboard, a mouse, storage media, and input/output ports, for example, any and all of which can be used to improve the experience and the productivity of the applications for the docked portable device. For example, a user's mobile phone may be docked to a docking station and then afforded the ability, within that wireless docking environment, to use a bigger display screen from a TV or computer, for example, when interacting with an e-mail client, a web browser, or some other application running on the mobile phone.

Figure 2:
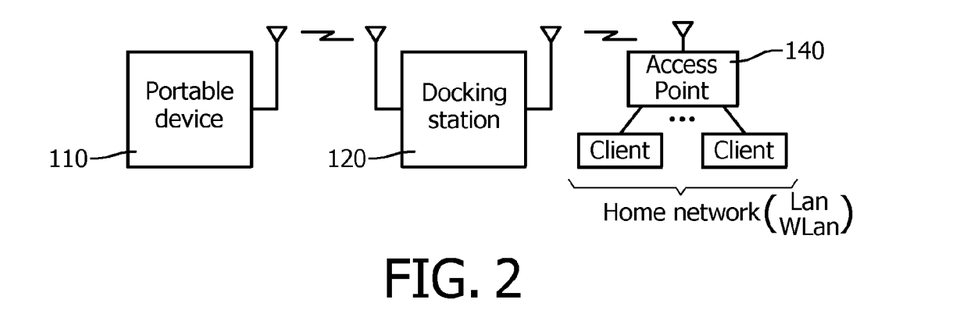

As shown in FIG. 2, the docking station may even afford the portable device access to a network, such as a wired or wireless local area network (LAN), wherein docking station 120 is wirelessly connected to the home network clients via access point 140 on the WLAN.

Portable device 110 is sometimes called a dockee or wireless dockee. The docking station can also be referred to as a wireless docking host. Peripherals are generally connected in some communicative manner—such as a wired connection or a wireless connection or pairing—to the docking station via input/output ports. The term "wireless docking environment" is intended to include the wireless docking station as well as any peripherals, devices, input or output ports, networks, or the like that are connected to, or accessible from, the docking station. In order to realize wireless docking, the portable device 110 communicates wirelessly with one or more docking stations 120 in order to gain access to the one or more peripherals 130 in the wireless docking environment 100.

Wireless communication technologies such as Bluetooth and Wi-Fi, including Wi-Fi Direct, can provide all or part of the communication capability required for the successful operation of wireless docking and undocking between the portable device and the docking station. For certain applications, one wireless communication technology may have an advantage over other available techniques. For example, Bluetooth would appear to possess insufficient bandwidth for enabling high-quality, low-latency, remote display output and generic access to USB peripherals. It may therefore be advantageous under certain conditions to use a combination of Bluetooth and Wi-Fi Direct for enabling different aspects of wireless docking and undocking.

Wi-Fi Direct, which is also known as Wi-Fi Peer-to-Peer (P2P), is a new communication standard for establishing peer-to-peer Wi-Fi connections between devices without the need for an external wireless access point. In the wireless docking regime, Wi-Fi Direct can be used as the primary connection and communication path between the portable device and a docking station. These communication technologies are exemplary technologies for use in the realization of the wireless docking system described herein. Other technologies may also be employed without departing from the principles of this invention. For example, it should be understood that additional communication technologies including Bluetooth Low Energy (BTLE) and MIMO antenna systems may be employed in the practice of all the inventive techniques described herein.

A set of techniques based, at least in part, on one or both of the communication technologies mentioned above is defined between the portable device and the docking station in order to provide easy convenient automatic connection setup between the portable device and the docking station and the peripherals connected to the docking station. The description below addresses an exemplary set of techniques, which are used in the operation of the portable device and the docking station and which are defined at least in part for configuring and controlling the docking process.

In a wireless docking environment shown in FIG. 1, it is possible to group many peripheral devices with a single docking station so that the peripherals can each be accessed by a portable device initiating a docking action. The portable device is considered to be "docked"—that is, the portable device is in a docked state—when it has access via the docking station to one or more of the devices, which are considered as a part of the wireless docking environment selected for docking. When it is desired to disconnect the portable device from the wireless docking environment, an undocking action is initiated. The portable device is considered to be "undocked"—that is, the portable device is in an undocked state—when the portable device no longer has access to, or a connection with, those same peripheral devices via the docking station. In accordance with the principles of the present invention and in contrast with the prior art, docking and undocking are handled as automatically as possible while still allowing user control and configuration of the docking and undocking procedures.

A docking process that leads from an undocked to a docked state can be defined to include a number of different elements. These elements include, but are not limited to: a trigger event to initiate the docking process; establishment of one or more wireless connections (i.e., one or more communication paths) between the portable device and the wireless docking host or hosts; and selection of wireless protocols, such as Wi-Fi channels, and interface settings in order to allow the portable device access to, and interaction with, each peripheral device in the wireless docking environment. The various parts of the process can be undertaken by one or both of the portable device and the docking station.

The established connection or communication path between the docking station and the portable device is generally a secure path, although insecure connections may be employed for docking. A secure connection is typically based on a trust mechanism in order to protect against malicious attacks such as a "man in the middle" attack, which is well documented in the technical literature. Trust, in this application, may be based on proximity as well as other measurable or predetermined conditions. When the portable device and the docking station are close together, there may be a sufficiently high level of confidence in the security of the communication path and that the portable device and the docking station are actually communicating with each other and not with an attacker or imposter. Proximity also permits visual inspection by the user, who will notice whether the connection is trustworthy and whether anything appears to be amiss. It would be appreciated that, when the portable device and the docking station are in sufficiently close proximity, it may be appropriate to reduce the transmitted signal power levels of these devices to a sufficiently low level that only the two devices (i.e., docking station and dockee) can pick up the signals of the other.

Initiation or triggering of docking assumes that the portable device is in an undocked state with respect to the wireless docking environment. That is, the portable device is not presently docked with the desired docking station. A docking action can be triggered by any number of actions or gestures when the desired docking station is located and selected for docking. For example, the portable device can scan a near-field communication tag on a docking station to indicate an express intent to dock with that station. Alternatively, a docking signal could be generated in response to a user pressing a specific button or display icon on the portable device or even on the selected docking station. Other docking gestures or actions are also contemplated for triggering the docking operation. These alternate triggering actions include placing the portable device inside a certain area such as atop a pad, inside a conforming cradle, or simply within a certain predetermined distance of the docking station, all where the action is detected based on radio signal strength. Other exemplary triggering actions are also possible, and could be realized as additional features in a docking system.

It should also be understood that docking may be initiated between several docking stations in the wireless docking environment and the portable device. This may occur when different docking stations support docking environments that can handle the various types of data or information being conveyed to and from the portable device. In one example, one docking station may connect video information from the portable device to a display peripheral such as an HDTV in a home entertainment system, while another separate docking station connects audio information from the same portable device to an audio system such as surround sound components in the connected home entertainment system. Other examples of connections between a portable device and several docking stations concurrently are possible.

Undocking a portable device from the wireless docking environment, and particularly from the one or more docking stations to which it is docked, can be simply viewed herein as the inverse or opposite of docking. A trigger event of some kind is preferred for initiating the undocking operation. While the trigger event can be the inverse or opposite of the trigger event used to initiate docking, it should be understood that a completely different trigger event may, and often should, be used for undocking. For example, when docking is initiated by placing a portable device on a docking pad or into a docking cradle, then it may not be convenient if undocking is automatically initiated when removing the portable device from the docking pad or cradle. Removal may simply be a user action such as lifting the portable device for answering a call. In this example, the user may have had no intention for the removal action (i.e., lifting) to initiate an undocking operation at all. The established wireless docking connection over a Wi-Fi link between the phone and the docking host, for example, can be maintained with some potential degradation whether or not the portable device is physically cradled in the docking host cradle. Signal degradation may also occur as a result of the user's body blocking at least some portion of a direct signal path (i.e., a line of sight path) between the portable device and the docking station or just as a result of the received power reduction from a greater separation between the portable device and the docking station when the portable device is being moved while still docked.

Figure 3:
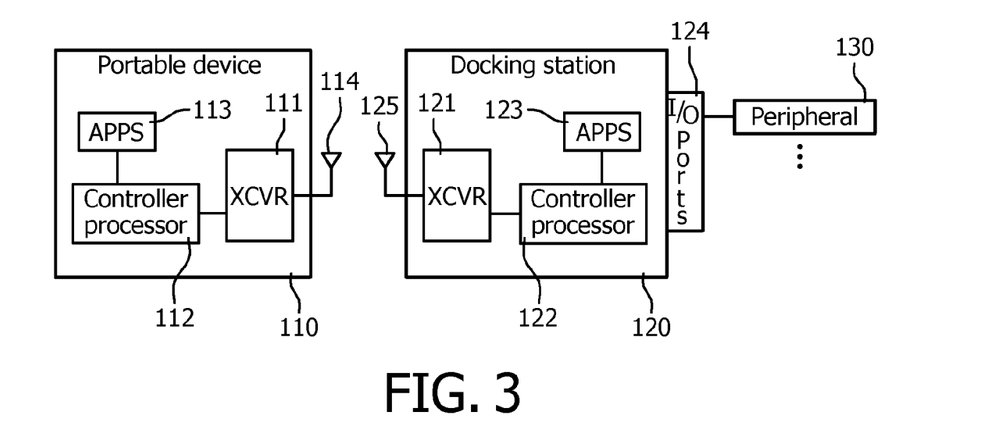
FIG. 3 shows a more detailed representation of the portable device and docking station shown in FIGS. 1 and 2.

Exemplary simplified realizations of a portable device 110 and a docking station 120 are shown in FIG. 3. The portable device includes: a transceiver 111; a processor/controller 112; a memory 113 suitable for storing configuration information, driver information, and device applications (memory 113 is depicted in the figures as storing the applications, for example); and an antenna 114. Device control and operation is provided via controller processor 112, which is connected between the transceiver 111 and the memory 113. The transceiver 111 provides the radio capabilities including transmission and reception. It is connected to antenna 114. While one antenna is shown in the figure, it will be understood that portable device 110 may include more than one antenna operating in a single or even dual mode capacity. The portable device applications also include, but are not limited to, the docking procedure, the undocking procedure, and the threshold calibration and configuration procedure, for example.

Docking station 120 includes a transceiver 121, a processor/controller 122, a memory 123 suitable for storing configuration information, driver information, and device applications, input/output ports 124, and an antenna 114. Docking station control and operation is provided via controller processor 122, which is connected between the transceiver 121 and the memory 123. The transceiver 121 provides the radio capabilities including transmission and reception for the docking station. It is connected to antenna 125. While one antenna is shown in the figure, it will be understood that docking station 120 may include more than one antenna operating in a single or even dual mode capacity. The docking station applications also include, but are not limited to, the docking procedure, the undocking procedure, and the threshold calibration and configuration procedure, for example. Since the docking station allows connection to peripherals 130 via the input/output ports 124, the docking station memory will also include drivers for establishing and maintaining the connection to each peripheral. Input/output ports 124 provides a sufficient number of connection ports, such as input ports and output ports and bidirectional ports, for connecting peripheral devices in the wireless docking environment.

Figure 4:
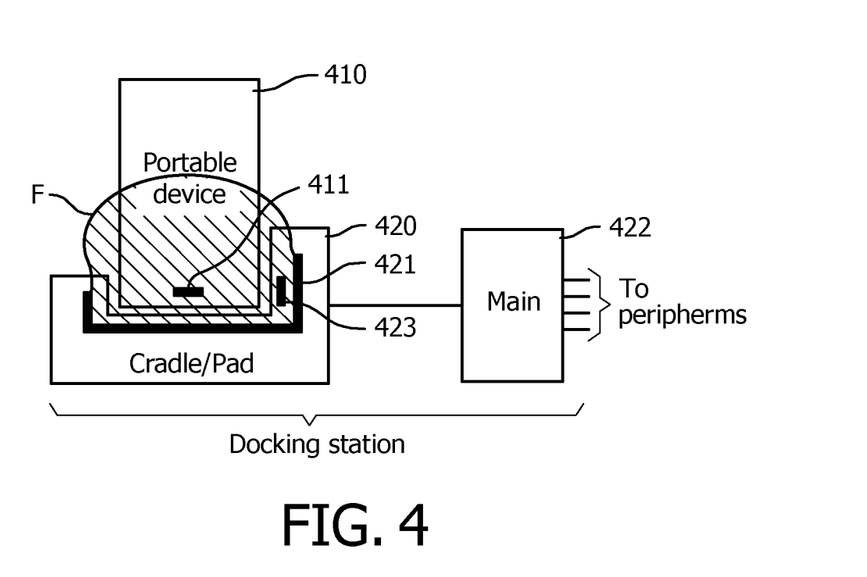
FIG. 4 shows another alternate embodiment of a portable device docked with a docking cradle portion of a docking station.

As noted above, the docking station may be, or may include, a cradle that completely or partially conforms to the contours of the portable device as shown in FIG. 4. The docking station may be realized as an electronic pad or surface suitable for accepting the placement of one or more portable devices. Such a pad can be realized similarly to wireless charging pads which are presently commercially available. When the portable device is placed on or near the pad surface, it can be docked with the docking station.

The docking station may be realized as a fully integrated device or it may be separated into several components such as a cradle 420 and a main section 422. In the separated embodiment, the main section of the docking station may utilize internal or external hardware and software such as a personal computer or the controller/processor and memory in FIG. 3 or the like in order to provide device intelligence, operations, and peripheral connectivity. Peripheral connectivity may be realized as a wired or wireless communication connection.

The docking station, and even the portable device, may be realized with a means for initiating the docking and/or undocking sequence (not shown in the figures). Such an initiating means can be realized by a button that, upon being pressed, causes a docking or undocking initiation signal to be generated for positively indicating intent to dock or undock the portable with the docking station, for example.

The docking station may include a charging element (not shown in the figures) to replenish the power in the portable device. Charging may be performed via either a wired (contact based) or wireless (contactless) coupling with the portable device.

It is useful here to distinguish between the concepts of physical docking versus logical docking. When a portable device is laying on a docking pad, or when it is positioned in a cradle, or when it has been placed by the user inside an area—whether physically demarcated or simply known to exist within certain boundaries—that is associated with a docking station or docking environment, it can be said that the portable device is physically docked to the docking station. Once a portable device enters the state of being physically docked, it is possible for this occurrence to trigger a docking action, which would result in the portable device also becoming logically docked. Removal of the portable device from the state of being physically docked may not necessarily result in the portable device being removed from its logically docked state.

Physical docking could be done by a user for any number of reasons, some of which may apply concurrently. Obviously, physical docking may be performed to initiate a logical docking Physical docking may also be performed in order to ensure that the portable device is connected to a power source for wired (contact-based) or wireless (contactless) charging as is accomplished by placing a phone on a charging pad or into a charging cradle, for example. Further, physical docking may be performed to enhance the quality of the communication channel between the portable device and the one or more docking stations, and ultimately between the portable device and the peripherals which are connected via the docking station(s). Proximity of the portable device to the docking station can improve signal quality (i.e., SNR or the like), communication speed and latency, and the like. Finally, physical docking can be viewed as an input to a security mechanism in the docking station so that the docking process can proceed more securely and/or so that the docking process can omit some security dialog steps that the user would have to go through otherwise when logically docking from a distance. Placement of the portable device onto a docking pad or into a docking cradle can be interpreted as a sign of trust by the portable device and by the docking station. Security dialog steps may include pin code authentication or password or challenge exchanges or the like between the portable device and the docking station.

In view of the immediate proximity of the portable device and the docking station, physical docking effectively thwarts man-in-the-middle attacks where a remote attacker with the right equipment can impersonate a portable device to a docking station, or a docking station to a portable device. A remote attacker would have to be closer to the docking station than the user and portable device. Hence, such an attacker would be quite visible to the user.

Physical docking, as mentioned above, can be used as a means for initiating a logical docking of the portable device to one or more docking stations. But automatic initiation of logical docking based simply on having the portable device within the communication range of one or more docking stations can be problematic with many unintended consequences. Several scenarios are presented below to highlight these problems.

When multiple docking stations are within range of a portable device, it is unclear to the user with which docking station the portable device will ultimately dock. The portable device may dock with a nearby wireless docking environment even though the user did not ever intend or expect to dock with that nearby environment. For example, when a user walks inside an office building and down a hallway carrying the portable device, the portable device may attempt automatic docking with each and every docking station in range of and passed by the portable device even though docking was not intended by the user. In a home network area, the portable device may even attempt automatic docking with a docking station in a nearby neighbor's network. Automatic docking in this scenario usurps control from the user over selection of the docking station with which the user actually wants to initiate docking.

When the docking environment has a display screen available as a connected peripheral, it is typically expected that docking can involve a transfer of the screen output from the portable device to the display screen in the wireless docking environment. In such a scenario, as the screen output is transferred to the display in the docking environment, the active display output on the portable device is generally turned off in order to save power for the portable device and in order to avoid creating a confusing experience for the user with possibly two different displays showing the same information content. In this situation, the screen of the now automatically docked portable device would be blanked and not available for viewing or interaction by the user. If the user and portable device are not in viewing range of the peripheral display attached to the docking station, the user will be unaware of the situation and will not necessarily know what is being displayed or even where it is being displayed. Moreover, if the peripheral display was being used by others at the time for another viewing purpose or presentation, then the automatic docking of the portable device and the display of its information will surprise and disrupt the viewers and it will even possibly embarrass the user. From these scenarios, it is clearly desirable for the user to be able to exercise more control over at least the initiation of "automatic" docking in the wireless docking process.

A similar case can be made for allowing user configuration and control over automatic undocking. It is ineffective to base initiation of the undocking operation solely on having the portable device being out of communication range of the docking station. It also unfairly burdens the user by not allowing independent operation (i.e., "undocked") of the portable device to resume normally until the undocking is completed by having the user remove the portable from the communication range of the wireless docking environment.

Control may actually be afforded by allowing the user to configure when, where, and even how "automatic" docking and "automatic" undocking are permitted to commence. Distance via signal characteristic measurement can be used as one means for initiating docking and undocking. Docking and undocking gestures or other defined actions can also be configured by the user to indicate the intent of the user to dock or undock the portable device.

Figure 5:
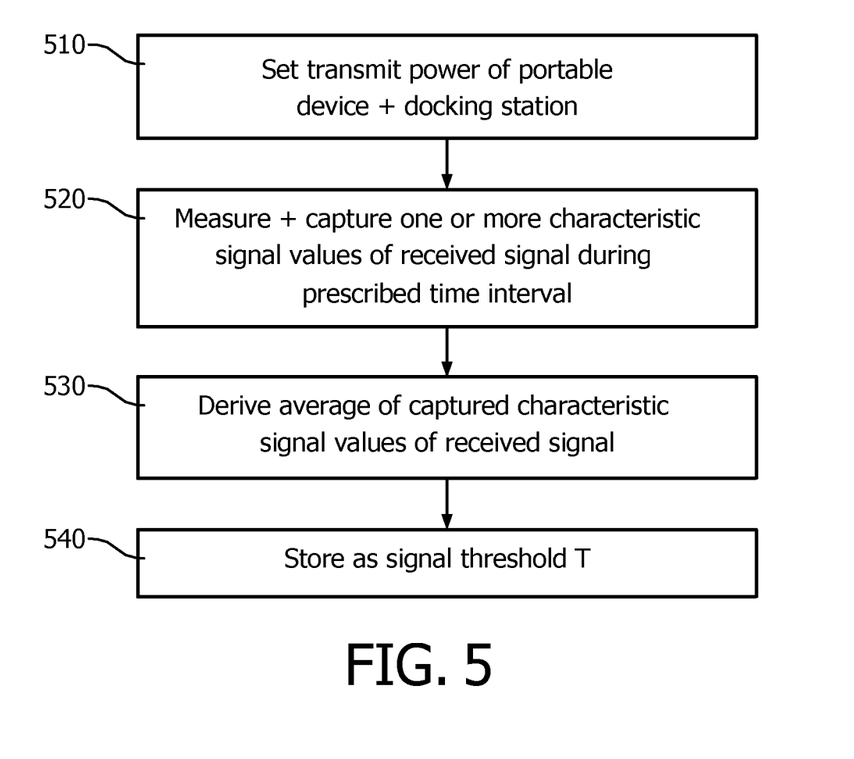
FIG. 5 shows an exemplary method for configuring the signal threshold T to be used in initiating logical docking.

In accordance with the principles of the present invention, a technique is realized in FIG. 5 to allow configuration of a distance at which a portable device can initiate docking and undocking with a wireless docking station device. Configuration of this distance affords the user and portable device a degree of control over automatic docking and automatic undocking.

The desired distance for initiating logical docking and undocking can be calibrated and configured by performing the exemplary method outlined below in the following steps. These steps may be performed by hardware, software, firmware, or any combination of the above in one or both of the portable device and the docking station. The method may be stored in the application memories shown in FIG. 3.

This technique avoids measuring distance directly and it exploits the correlation exhibited by the received signal power and the distance between a transmitter and a receive antenna. Directly measuring the distance between two objects by using RF signals such as Wi-Fi or Bluetooth signals can be difficult. Various attempts have been made in reported research for using RF signals characteristics such as time-of-flight measurements, or received signal strength indicator (RSSI), or even triangulation methods to directly measure distance and position of devices within a room. A number of these techniques are discussed in a technical paper by Subhan et al. entitled *"Minimizing discovery time in Bluetooth networks using localization techniques"*, and published at the 2010 International Symposium in Information Technology on pages 648-653 (June 2010).

Based on reported observations, it is understood that it is difficult to predict distance directly in a generic way using signal measurements such as RSSI. This difficulty is understandable because each device measures these signal characteristic values differently. Moreover, as the devices are separated by a greater physical distance, distance estimation becomes even more inaccurate. In addition, the measurement process becomes more complicated in the face of decreased received power due to increased device separation because many communication chipsets conforming to wireless standards dynamically change the transmit power to maintain good quality of the communication link, which in turn complicates any measurement process. Finally, it should be understood that these measurements also depend on the relative positioning and the angular relationship chosen between the two devices during the measurement, calibration, and configuration process.

As mentioned above, the technique shown in FIG. 5 avoids measuring distance directly and it exploits the correlation between received signal power and distance between a transmitter and a receive antenna. With the docking station and the portable device each operating at the same selected or determined transmit power in step 510, the portable device is moved to a location at the desired distance from the docking station for initiation of docking. By using a predetermined transmit power and a specific location and distance for configuration purposes, the problems of determining distance directly via power measurements are eliminated.

The transmit power level can be randomly chosen, provided that it is stored and retrievable for later use during the actual docking. Of course, the transmit power level could also be a previously defined level that is fixed by convention or standard. Also, the transmit power level could be set via a control message from one of the devices. For example, the power level could be communicated as part of a message exchange protocol between the docking station and the portable device whereby one of the devices instructs the other device to change the transmit power to a communicated or predetermined value.

During a prescribed time interval while the portable device is maintained at the desired distance, the portable device and/or the wireless docking station measure one or more characteristics of the received signal as shown in step 520. One such characteristic is the Received Signal Strength Indicator (RSSI) defined in the IEEE 802.11 standard. RSSI is an indication of the power level being received by the antenna. Other characteristics that can be measured along with or even in place of RSSI are: Received Channel Power Indicator (RCPI), which is defined in the IEEE 802.11 standard as a measure of the received RF power in a selected channel over the preamble and the entire received frame; Perceived Signal to Noise Indicator (PSNI); and Received Signal to Noise Indicator (RSNI). These latter terms, while they are defined in submissions to the IEEE 802.11 standards committee such as the submission IEEE 802.11-03/958r1 by J. Kwak entitled "*Proposed Text for PSNI Measurement*", are also found in United States Patent Application Publication Nos. 2006/0234660 and 2010/0150125, all of which are incorporated herein expressly by reference thereto.

The time interval employed for this step should be sufficient to allow capture of a desired number of representative samples of the signal characteristic or characteristics being measured. Although it is contemplated that the distance and power can be calibrated properly with only one signal characteristic sample measured, it is preferable to measure a plurality of representative samples for the signal characteristic(s). Thus, the time interval should be sufficiently long to permit the capture of the desired number of sample measurements.

When the sufficient number of signal characteristic(s) values has been measured by the portable device and/or the wireless docking station, an average value is derived from some or all of the measured values to improve the accuracy of the value given that the signal strength typically experiences a certain amount of temporal variability as shown in step 530. The average may even be computed over the ensemble of values for both the portable device and the wireless docking station. This average value is then stored in step 540 as part of the configuration for this particular wireless docking environment. This value may be stored in any or all of the portable device, the docking station, or an external storage device (not shown in the figures).

When the signal characteristic value has been stored, it can then be used by the portable device and/or the wireless docking station as a threshold T to determine whether the separation between the portable device and the docking station is within the desired distance, by virtue of a measured received signal power, so that logical docking can proceed automatically. The use of this stored signal characteristic value permits the user to maintain a degree of control over docking and undocking. The threshold T is determined to exceed a minimum signal strength level required for establishing communication between the portable device and the docking station. Moreover, since the determined threshold relates to distance between the communicating devices, it can be understood that the determined threshold is indicative of a boundary for an area within which the docked state is intended to be established between the potable device and the docking station.

Figure 6:
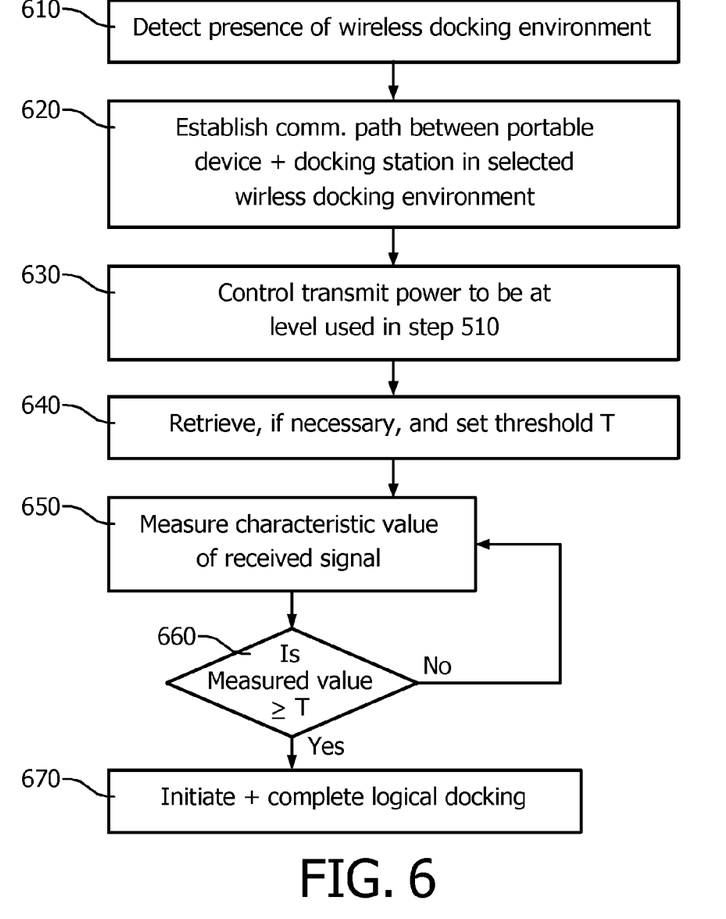
FIG. 6 shows an exemplary docking procedure realized in accordance with the principles of the present invention.

In order to dock a portable device to the docking station, the portable device detects the presence of the desired docking station in the wireless docking environment as shown in step 610 of FIG. 6. Typically, techniques like Bluetooth device discovery or Wi-Fi direct device discovery, both of which are well known techniques in the art, can be used to discover the docking station. These systems discover a docking station when it gets in radio communication range of a dockee (i.e., portable device). Many alternative discovery mechanisms known in the art are also contemplated for use here.

When the desired docking station is detected, a communication path or connection is established between the portable device and the docking station as shown in step 620. One purpose of this communication path is to send one or more packets over it, so that signal strength can be measured. A secondary purpose can be to support the calculation of the metric, in order to compare it with the threshold.

The transmit power level for the portable device is then controlled as shown in step 630. In one exemplary embodiment, the transmit power level is expected to be substantially the same power level which was used in the configuration step 510, discussed above, when the portable device was placed at a particular location so that it was at a desired distance from the docking station. A control message between the docking station and the portable device can be used to instruct the two docking devices to change their transmit power levels to the appropriate level mentioned above in step 510. An alternative may involve a procedure in which the dockee (i.e., portable device) sets its own transmit signal power to a certain determined transmit power level, and then sends a control message to the docking station, over the above communication path, instructing the docking station to do likewise. For example, one or both of the docking station and the portable device can begin transmitting one or more packets at a prescribed transmit power level. These one or more packets can include a data payload that shows the transmit power level at which they were transmitted.

In another exemplary embodiment, the transmit power levels of the two docking devices, that is, the portable device and the docking station, are controlled to be substantially equal. This is accomplished by exchange of a control message between the devices in order to indicate the appropriate transmit signal power level to be used.

If the docking station or the portable device does not have the measured threshold value stored locally, then the threshold value T should be retrieved, or forwarded to, that device as shown in step 640. The stored threshold T is then used as one possible measure for determining when docking (i.e., logical docking) can be initiated.

The appropriate signal characteristic level of the received signal such as RSSI is measured and compared to the determined threshold T in steps 650 and 660 so that, at least when the received signal level exceeds the determined threshold, docking the portable device to the docking station is able to be completed. The portable device and/or the wireless docking station device measure the RF signal characteristic(s) of the received signal. The signal characteristic or characteristics being measured are the same signal characteristic(s) used to establish the stored threshold value, which was explained in detail above. It is understood that the signal characteristics can include any one or more of the following: RSSI, RCPI, PSNI, RSNI, and the like.

When the threshold T is equaled or exceeded by the appropriate signal characteristic level of the received signal for a determined amount of time, logical docking is initiated so that docking can be completed as shown in step 660 ('YES' output branch) and step 670. It will be appreciated that the value of the signal level used to determine whether the threshold T is equaled or exceeded may also be an average value over several separate measurements taken over the determined period of time. The completion of docking involves, but is not limited to, setting up connections between the portable device and the peripherals communicating with the docking station, and transferring the display output from the portable device display to the remote display connected to the docking station. Completion of docking is perhaps better understood conceptually as a transition to a docked state from the undocked state. This terminology may be used interchangeably in this description without loss of generality.

If the threshold T is not equaled or exceeded by the appropriate signal characteristic level of the received signal, logical docking is not initiated and the measurement and comparison steps are repeated as shown in step 660 ('NO' output branch), which returns control to step 650.

Figure 7:
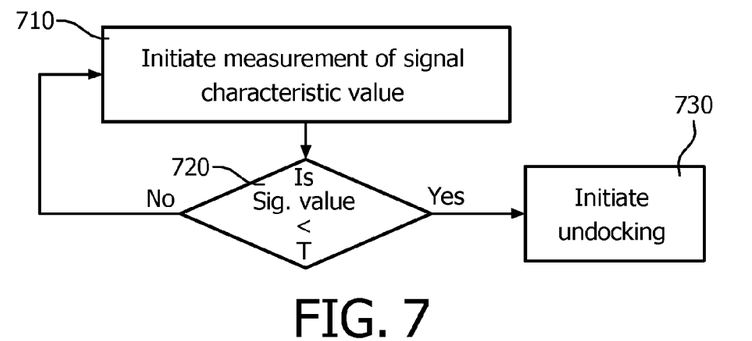
FIG. 7 shows an exemplary undocking procedure realized in accordance with the principles of the present invention.

For undocking, it is possible to effectively reverse the docking process described above. Obviously, prior to undocking, the portable device is already logically docked with the docking station. While the portable device is docked with the docking station, the portable device keeps measuring the signal characteristic values appropriate for the stored threshold T as shown in step 710. These measured values continue to be compared with the threshold. As long as the threshold is equaled or exceeded in step 720 ('YES' output branch), the portable device maintains its docked state and, if necessary, suppresses any automatic attempt to undock from the docking station.

As soon as the measured signal characteristic values fall below the threshold value as shown in step 720 ('NO' output branch), the undocking procedure is automatically initiated. Undocking entails, but is not limited to, closing all connections between the portable device and the peripherals via the docking station, and transferring any display output back to the portable device display from the remote display connected to the docking station. Undocking involves a transition from the docked state to an undocked state for the portable device.

It is also contemplated that step 710 may be modified so that, when the portable device has been successfully docked to the docking station, the portable device can suspend any measuring of the signal characteristic values appropriate for the stored threshold. In this alternate embodiment, signal characteristic measurements can be resumed upon the occurrence of a measurable event such as detection of changes by a movement sensor in the portable device, or recognition of a sudden significant drop in signal strength possibly indicative of the removal of the portable device from the docking station.

By realizing the system and method in this way, docking and undocking may be initiated easily, automatically, and reliably at a user desired distance. This technique circumvents the problems that would otherwise occur by attempting to measure distance and position directly from received RF signals.

Accuracy of this method and for this system can be improved by a number of different techniques described in more detail below. One of these techniques involves the use of multiple positions for measuring the signal characteristics of the received signal in determining the threshold T as related to FIG. 5 and in actual docking as related to FIG. 6. Another improvement involves the use of Wi-Fi and Bluetooth communication channels to obtain the threshold T. An additional improvement involves informing the portable device of the presence of an interference source such as a new access point when capturing signal characteristic values. The alternatives are described immediately below.

Instead of only measuring the RF signal characteristic measurement values at one particular position, it is contemplated that several measurements can be taken at different locations and device orientation angles within an expected range of the typical angles from which the user and portable device would normally approach the wireless docking system. For example, additional measurements may be taken at the same distance between the portable device and the docking station but from slightly different orientation angles. In one example, the additional measurements may be taken to the left and right of the initial location discussed above in reference to FIG. 5. These three sets of measurements, namely, from left of initial position, from right of initial position, and from the initial position, can be included in the average value calculation for determining the threshold value T.

In practice, it may be simpler or more efficient to use just one wireless communication medium, such as Wi-Fi Direct, for example, in order to make the necessary signal characteristic measurements. It is understood that the accuracy of the measurements may be improved by using two different wireless communication media. This approach would make use of the fact that both the portable device and the docking station can generally support both Wi-Fi Direct and Bluetooth. All measurements and thresholds can be replicated for the Bluetooth and Wi-Fi Direct media. Docking (or undocking) would then be initiated when both the measured Bluetooth signal characteristic and the measured Wi-Fi Direct signal characteristic exceed (or fall below, in the case of undocking) the threshold T. In this way, the probability of reaching the desired docking or undocking behavior at the desired distance is increased significantly. For this approach, the measurements may be performed concurrently, since that would give the best representation in substantially similar channel conditions. It would be preferable if the Bluetooth master and the Wi-Fi Direct Group owner, which in the case of wireless docking are both likely to be situated at the wireless docking station, coordinate the frequencies used during the measurements in order to reduce or otherwise limit interference with, and variation in, the measured signal strength values.

If the docking station device, which typically is fixed or at least temporarily stationary, detects that a new interference source has been added such as a newly added access point emitting a strong signal in the network, the docking station can notify the portable device during the connection setup with the information about the presence of the new interference source. The portable device can utilize this information while calculating the measured signal characteristic values in relation to the threshold value T. This approach could also be employed to warn the user and the portable device to re-calibrate the portable device threshold in view of the presence of the interference source.

In further alternative embodiments in accordance with the inventive principles discussed above, docking and undocking gestures can be detected to initialize a trust relationship between the portable device and the docking station so that the two devices can proceed with docking or undocking. Detection is performed primarily by the controller processor and may include applications or programs stored in memory associated with the controller processor as well as measurements of signal strength or the like from the transceiver.

Docking, charging cradles and pads are available for use with portable devices. There are advantages to using the cradle or pad as a docking station. For example, when physical docking is detectable, the act of placing the portable device 410 into a conforming cradle 420 or onto a pad can stand as a clear indication (i.e., a gesture) from the portable device and its user to the wireless docking environment that logical docking should commence immediately, and that the main part 422 of the docking station at or connected to the cradle/pad can be trusted by the portable device and its user. Trust in this context is understood to mean that, via the gesture of physical docking into a cradle or onto a pad, the portable device and user authorize the transmission of private or secure information to the docking station.

In certain instances, a wireless connection may be possible or may exist between the docking station and the portable device before the physical docking of these devices because, for example, the devices may be in transmission range of each other even if not physically docked. By the act of physical docking, the user intends to initiate a docking process and announce a trust relationship as described above.

Detection of physical docking can be provided either by the docking station or by the portable device or by a combination of operations performed by both of these devices. Detection can be performed by a detection element in the docking station employing a mechanical sensor or an electrical sensor, whether via electrical contact or via wireless means, to detect the physically docked presence of the portable device.

Signal strength can also be used in a gesture to detect physical docking by employing the signal measurements from the antenna in one or both of the docking station and the portable device. The occurrence of physical docking by using signal strength measurements may utilize a signal threshold similar to the one discussed above. In the present scenario, the physical docking threshold would be selected or computed in such a way as to insure that the devices are sufficiently close together so that physical docking and the physical docking gesture can be inferred from the spatial relationship or separation of the docking station and the portable device. The physical docking threshold may actually be different from the threshold discussed above for initiating logical docking. While the physical docking threshold may be a fixed number, it may also be dynamically computed based on knowledge of the properties of the antenna and radio system in the portable device and/or the current transmission power(s) being used by the docking station and the portable device.

In another embodiment, the portable device and the docking stations may include elements that influence the shape and location of the antenna footprint F of at least one antenna, perhaps, the antenna 423 associated with the docking station including elements 420 and 422. The antenna footprint F is the radiation pattern over a region in which the received signals between the docking station 420/422 and the portable device 410 are to be measured and are expected to be above the threshold T used for the initiation of logical docking. The antenna footprint can be shaped in part by controlling the transmission power applied to the docking station antenna 423. Moreover, the antenna footprint can also be shaped in part by controlling the receiving sensitivity of the portable device antenna 411. Shielding 421 applied judiciously around at least a portion of the perimeter of the docking station antenna may also be used to affect the size and shape of the antenna footprint F. Of course, each antenna can be initially designed to have a directional field having the proper size and shape to achieve a desired footprint. Finally, it is understood that, as the portable device enters the field of the docking station antenna, active and/or passive elements located in the portable device can be used to shape the docking station antenna footprint. Such elements in the portable device may include: metal plates for shielding, or software applications, or fixed hardware elements, that all can be employed to control one or more of the directionality, the transmit power, and the receive sensitivity of antenna 411. It should be noted that a sudden rise in signal strength may be indicative of a physical docking for the portable device.

Further refinements of the inventive principles are related to the detection of undocking through the use of a second threshold $T_2$, which is defined to be lower than the threshold T used for the initiation of logical docking. The signal strength received by the portable device and/or the docking station is monitored to detect an undock gesture. An undock gesture may be detected when the signal strength drops below the second threshold $T_2$, which is defined to be lower than (or equal to) the threshold T used for the initiation of logical docking. A lower threshold $T_2$ is perceived to be beneficial for robustness of the detector and to allow for movement of the portable device without sensing a physical undocking gesture to have occurred. In this case, a user would be able to pick up the portable device such as a mobile phone and continue a phone conversation without causing undocking and without causing an undocking gesture to be sensed. As a result of this lower second threshold $T_2$, undocking is assured when the user and portable device move sufficiently far away from the docking station.

As mentioned above, physical docking or a docking gesture can be employed to establish a trust relationship between the docking station and the portable device. In order to ensure a trusting relationship, a high signal threshold $T_3$ can be used wherein the threshold $T_3$ is so high that an antenna signal exceeding the high threshold $T_3$ cannot possibly be received by the docking station from a portable device located a long distance away given the capabilities of commercially available electronic devices. That is, the docking station and the portable device must be physically close together for the high threshold $T_3$ to be exceeded.

In addition, as part of establishing a trust relationship, the portable device can transmit at an extremely low power for certain selected information such as private, sensitive, or secure information, thereby making it difficult for any party other than the selected docking station to receive the low power transmission. In a complementary manner, the selected docking station portable device can transmit at an extremely low power for certain information, thereby making it difficult for any party other than the portable device to receive the information in the low power transmission.

For further protection, any received signal strength in excess of the docking initiating threshold T by a particular increment H can be designated as being transmitted by an external attacker. In this case, no trust relationship will be established with the designated attacker and the suspected attacker will be prevented from docking.

Finally, trust and security can be improved through the use of certificates issued by a certificate authority. Here the docking station is designed to be certified by a certificate authority as a legitimate docking station that applies the principles of this invention as a means of establishing a trust relationship with a portable device attempting to dock with the docking station. This certification leads to certain secret values being placed in the docking station, the presence of which can be verified by the portable device without revealing the actual values to the portable device or any eavesdropper.

All examples and conditional language recited herein are intended for pedagogical purposes to aid the reader in understanding the present principles and the concepts contributed by the inventors to furthering the art, and are to be construed as being without limitation to such specifically recited examples and conditions. Moreover, all statements herein reciting principles, aspects, and embodiments of the present principles, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It will be appreciated by those skilled in the art that the block diagrams presented herein represent conceptual views of illustrative system components and/or circuitry embodying the principles of the present invention. Similarly, it will be appreciated that any flow charts, flow diagrams, state transition diagrams, pseudo code, and the like represent various processes which may be substantially represented in computer readable media and so executed by a computer or processor, whether or not such computer or processor is explicitly shown.

The functions of the various elements shown in the figure may be provided through the use of dedicated hardware as well as hardware capable of executing software in association with the appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor ("DSP") hardware, read-only memory ("ROM") for storing software, random access memory ("RAM"), and other non-volatile storage.

The methods described herein may be implemented by instructions being performed by a processor, and such instructions may be stored on a processor-readable medium such as, for example, an integrated circuit, a software carrier or other storage device such as, for example, a hard disk, a compact diskette, a random access memory ("RAM"), or a read-only memory ("ROM"). The instructions may form an application program tangibly embodied on a processor-readable medium. As should be clear, a processor may include a processor-readable medium having, for example, instructions for carrying out a process. Such application programs may be uploaded to, and executed by, a machine comprising any suitable architecture. Preferably, the machine is implemented on a computer platform having hardware such as one or more central processing units ("CPU"), a random access memory ("RAM"), and input/output ("I/O") interfaces. The computer platform may also include an operating system and microinstruction code. The various processes and functions described herein may be either part of the microinstruction code or part of the application program, or any combination thereof, which may be executed by a CPU. In addition, various other peripheral units may be connected to the computer platform such as an additional data storage unit and a printing unit.

It should be understood that the elements shown in the figures may be implemented in various forms of hardware, software, firmware, or combinations thereof. Preferably, these elements are implemented in a combination of hardware and software on one or more appropriately programmed general-purpose devices, which may include a processor, memory and input/output interfaces. Moreover, the implementations described herein may be implemented as, for example, a method or process, an apparatus, or a software program. Even if only discussed in the context of a single form of implementation (for example, discussed only as a method), the implementation of features discussed may also be implemented in other forms (for example, an apparatus or program). An apparatus may be implemented as mentioned above. The methods may be implemented in, for example, an apparatus such as, for example, a processor, which refers to processing devices in general, including, for example, a computer, a microprocessor, an integrated circuit, or a programmable logic device.

It is to be further understood that, because some of the constituent components and methods depicted in the accompanying drawings may be implemented in software, the actual connections between the system components or the process function blocks may differ depending upon the manner in which the present principles are programmed. Given the teachings herein, one of ordinary skill in the pertinent art will be able to contemplate these and similar implementations or configurations of the present principles.

A number of implementations have been described. Nevertheless, it will be understood that various modifications may be made. For example, elements of different implementations may be combined, supplemented, modified, or removed to produce other implementations. Additionally, one of ordinary skill will understand that other structures and processes may be substituted for those disclosed and the resulting implementations will perform at least substantially the same function(s), in at least substantially the same way(s), to achieve at least substantially the same result(s) as the implementations disclosed. In particular, although illustrative embodiments have been described herein with reference to the accompanying drawings, it is to be understood that the present principles is not limited to those precise embodiments, and that various changes and modifications may be effected therein by one of ordinary skill in the pertinent art without departing from the scope or spirit of the present principles. Accordingly, these and other implementations are contemplated by this application and are within the scope of the following claims.

We claim:

1. A method for docking a portable device with a docking station in a wireless docking environment, the method comprising:

detecting whether said docking station and the portable device are within wireless communication range;

establishing a communication path between the portable device and the docking station;

measuring a characteristic value of a signal received from the portable device or the docking station;

comparing the characteristic value of the signal with a predetermined threshold; and docking the portable device with the docking station when the characteristic value of the signal exceeds the predetermined threshold, wherein the predetermined threshold has been previously obtained by:

preselecting a transmit power level for the portable device and the docking station;

positioning the portable device at a predetermined distance from the docking station for docking the portable device with the docking station at the preselected transmit power level;

measuring a plurality of characteristic values of a signal transmitted between the portable device and the docking station during a preselected time interval; and averaging the measured plurality of characteristic values over the preselected time interval to store as the predetermined threshold.

2. The method as defined in claim 1, wherein the characteristic value of the signal is selected from at least one of Received Signal Strength Indicator (RSSI), Received Channel Power Indicator (RCPI), Perceived Signal to Noise Indicator (PSNI), and Received Signal to Noise Indicator (RSNI).

3. The method as defined in claim 1, further comprising establishing a connection via the docking station between the portable device and at least one peripheral device connected to the docking station.

4. The method as defined in claim 1, further comprising detecting a gesture indicative of an intent to dock within the wireless docking environment.

5. The method as defined in claim 1, further comprising:
measuring the characteristic value of the signal while the portable device is docked with the docking station;
comparing the characteristic value of the signal with the predetermined threshold; and
docking the portable device from the docking station when the characteristic value of the signal is less than the predetermined threshold.

6. The method as defined in claim 1, further comprising transmitting at least one packet between the portable device and said docking station, wherein said at least one packet is transmitted at a predetermined transmit signal strength.

7. The method as defined in claim 1, wherein the predetermined threshold indicates a boundary for an area within which the docking is established between the portable device and the docking station.

8. The method as defined in claim 5, further comprising terminating a connection from the portable device to at least one peripheral device connected to the docking station, wherein the connection was established during the docking.

9. The method as defined in claim 6, wherein said at least one packet includes data indicative of said predetermined transmit signal strength.

10. A portable device for docking with a docking station in a wireless docking environment, comprising:

a transceiver configured for establishing a communication path between the portable device and the docking station when the portable device is within a wireless communication range of the docking station; and a processor configured for:
detecting whether the portable device is within the wireless communication range of the docking station;
measuring a characteristic value of a signal received from the docking station;
comparing the characteristic value of the signal with a predetermined threshold; and
docking the portable device with the docking station when the characteristic value of the signal exceeds the predetermined threshold, wherein the predetermined threshold has been previously obtained by:
preselecting a transmit power level for the portable device and the docking station;
positioning the portable device at a predetermined distance from the docking station for docking the portable device with the docking station at the preselected transmit power level;
measuring a plurality of characteristic values of a signal transmitted between the portable device and the docking station during a preselected time interval; and
averaging the measured plurality of characteristic values over the preselected time interval to store as the predetermined threshold.

11. A docking station for docking with a portable device in a wireless docking environment, comprising:

a transceiver configured for establishing a communication path between the portable device and the docking station when the portable device is within a wireless communication range of the docking station; and a processor configured for:
detecting whether the portable device is within the wireless communication range of the docking station;
measuring a characteristic value of a signal received from the portable device;
comparing the characteristic value of the signal with a predetermined threshold; and
docking the portable device with the docking station when the characteristic value of the signal exceeds the predetermined threshold, wherein the predetermined threshold has been previously obtained by:
preselecting a transmit power level for the portable device and the docking station;
positioning the portable device at a predetermined distance from the docking station for docking the portable device with the docking station at the preselected transmit power level;
measuring a plurality of characteristic values of a signal transmitted between the portable device and the docking station during a preselected time interval; and
averaging the measured plurality of characteristic values over the preselected time interval to store as the predetermined threshold.

* * * * *